(12) United States Patent
Eller et al.

(10) Patent No.: US 9,129,605 B2
(45) Date of Patent: Sep. 8, 2015

(54) AUTOMATED VOICE AND SPEECH LABELING

(71) Applicant: SRC, Inc., North Syracuse, NY (US)

(72) Inventors: David Donald Eller, Canastota, NY (US); Steven Brian Morphet, Camillus, NY (US); Watson Brent Boyett, Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 238 days.

(21) Appl. No.: 13/828,856

(22) Filed: Mar. 14, 2013

(65) Prior Publication Data

US 2013/0262111 A1    Oct. 3, 2013

Related U.S. Application Data

(60) Provisional application No. 61/617,884, filed on Mar. 30, 2012.

(51) Int. Cl.
| | |
|---|---|
| *G10L 15/26* | (2006.01) |
| *G10L 15/22* | (2006.01) |
| *G06F 17/30* | (2006.01) |
| *G10L 15/10* | (2006.01) |

(52) U.S. Cl.
CPC .......... *G10L 15/26* (2013.01); *G06F 17/30746* (2013.01); *G10L 15/10* (2013.01); *G10L 15/22* (2013.01)

(58) Field of Classification Search
CPC ....... G10L 15/06; G10L 15/01; G10L 15/265; G10L 25/78; G10L 15/005; G10L 15/187; G10L 15/02; G10L 15/14; G10L 15/065; G10L 13/08; G10L 15/22; H04M 3/51; G06F 17/30746

USPC .............. 704/235, 256.7, 260, 243, 231, 251, 704/257, 258, 240; 379/265.02, 309, 52, 379/88.16

See application file for complete search history.

(56) References Cited

U.S. PATENT DOCUMENTS

| | | | |
|---|---|---|---|
| 5,574,784 A | * | 11/1996 | LaPadula et al. ........ 379/265.02 |
| 5,615,299 A | | 3/1997 | Bahl et al. |
| 5,655,058 A | | 8/1997 | Balasubramanian et al. |
| 5,659,662 A | | 8/1997 | Wilcox et al. |
| 5,799,276 A | | 8/1998 | Komissarchik et al. |
| 6,029,132 A | * | 2/2000 | Kuhn et al. .................... 704/260 |

(Continued)

FOREIGN PATENT DOCUMENTS

| | | |
|---|---|---|
| EP | 689193 A1 | 12/1995 |
| EP | 1511008 A1 | 3/2005 |

(Continued)

OTHER PUBLICATIONS

Arai, "A Speech Labeling System Based on Knowledge Processing." Systems and Computers in Japan, vol. 23 (6):35-51.

(Continued)

*Primary Examiner* — Vijay B Chawan
(74) *Attorney, Agent, or Firm* — George R. McGuire; Bond Schoeneck & King, PLLC

(57) ABSTRACT

A system and method for voice and speech analysis which correlates a speaker signal source and a normalized signal comprising measurements of input acoustic data to a database of language, dialect, accent, and/or speaker attributes in order to create a transcription of the input acoustic data.

20 Claims, 3 Drawing Sheets

(56) References Cited

U.S. PATENT DOCUMENTS

| | | | |
|---|---|---|---|
| 6,148,285 A * | 11/2000 | Busardo | 704/260 |
| 6,233,553 B1 * | 5/2001 | Contolini et al. | 704/220 |
| 6,738,745 B1 * | 5/2004 | Navratil et al. | 704/277 |
| 6,882,970 B1 * | 4/2005 | Garner et al. | 704/236 |
| 6,961,701 B2 | 11/2005 | Ogawa et al. | |
| 7,092,888 B1 * | 8/2006 | McCarthy et al. | 704/277 |
| 7,139,714 B2 | 11/2006 | Bennett et al. | |
| 7,277,854 B2 | 10/2007 | Bennett et al. | |
| 7,475,016 B2 | 1/2009 | Smith et al. | |
| 7,941,317 B1 * | 5/2011 | Goffin et al. | 704/256.7 |
| 2002/0101537 A1 * | 8/2002 | Basson et al. | 348/465 |
| 2002/0194005 A1 * | 12/2002 | Lahr | 704/271 |
| 2003/0191643 A1 * | 10/2003 | Belenger et al. | 704/254 |
| 2004/0024582 A1 * | 2/2004 | Shepard et al. | 704/2 |
| 2007/0027673 A1 | 2/2007 | Moberg | |
| 2007/0067755 A1 | 3/2007 | Hinchey et al. | |
| 2007/0198269 A1 * | 8/2007 | Braho et al. | 704/270 |
| 2008/0103761 A1 | 5/2008 | Printz et al. | |
| 2008/0195391 A1 | 8/2008 | Marple et al. | |
| 2009/0030690 A1 | 1/2009 | Yamada | |
| 2009/0125301 A1 | 5/2009 | Master et al. | |
| 2009/0187410 A1 | 7/2009 | Wilpon et al. | |
| 2009/0319267 A1 | 12/2009 | Kurki-Suonio | |
| 2012/0053937 A1 | 3/2012 | Cao | |

FOREIGN PATENT DOCUMENTS

| | | |
|---|---|---|
| JP | 2004246227 A | 9/2004 |
| JP | 2004341390 A | 12/2004 |
| KR | 1020090048211 | 5/2009 |

OTHER PUBLICATIONS

Li, "Speaker Recognition Based on Pitch-Dependent Affective Speech Clustering." Moshi Shibie yu Rengong Zhineng/Pattern Recognition and Artificial Intelligence, Accession No. 20091512023233.

Sidaras, "Perceptual Learning of Systematic Variation in Spanish-Accented Speech." Journal of the Acoustical Society of America, Accession No. 20092112088506.

Makino & Wakita, "Automatic Labeling System Using Speaker-Dependent Phonetic Unit References." Acoustics, Speech, and Signal Processing, IEEE International Conference on ICASSP '86. Publication date: Apr. 1986, vol. 11:2783-2786. Current version published Jan. 29, 2003.

Margolis & Ostendorf, "Acoustic-Based Pitch-Accent Detection in Speech: Dependence on Word Identity and Insensitivity to Variations in Word Usage." Acoustics, Speech, and Signal Processing 2009. ICASSP 2009. IEEE International Conference on Apr. 19-24, 2009, pp. 4513-1516. Digital Object Identifier 10.1109/ICASSP.2009.4960633.

International Search Report Form PCT/ISA/210, International Application No. PCT/US2013/034582, pp. 1-11, Dated Jun. 28, 2013.

* cited by examiner

AUTOMATED VOICE AND SPEECH LABELING

CROSS-REFERENCE TO RELATED APPLICATIONS

This application claims priority to U.S. Provisional Application No. 61/617,884, filed on Mar. 30, 2012, the entirety of which is hereby incorporated by reference.

BACKGROUND OF THE INVENTION

1. Field of the Invention

The present invention relates to a speech data analysis system, and, more specifically, to a system that correlates speaker signal source and a normalized signal comprising measurements of input acoustic data to a database of language, dialect, accent, and/or speaker attributes in order to create a detailed transcription of the input acoustic data.

2. Description of the Related Art

Speech transcription is an evolving area of technology served by several disparate technologies targeted at subsets of the issue. Individual systems and applications focus on and attempt to solve their own problems, including speech-to-text, phrase and word recognition, language recognition, and speaker identification. However, each of these techniques applies only rudimentary signal processing techniques, and none are able to achieve high levels of accuracy without a large amount of training.

Automatic Speech Recognition ("ASR") systems convert spoken words into text, and include systems as diverse as call routing, voice dialing, and data entry, as well as advanced speech-to-text processing software packages. These systems are often based on a language model and require domain training in which a user trains the system to recognize his specific voice, accent, and/or dialect. Although effective, domain training results in several limitations on the application of the approach, both in the specific speech domain and in how much confidence the user has in the product. Additionally, in situations in which a significant amount of training is required, the time and effort required can be a substantial barrier to adoption by new users.

In addition to training requirements, ASR systems continue to suffer from less-than-perfect accuracy, with some estimating a current peak effectiveness of only 80-90%. In other words, in every ten words converted to text, one or two on average are incorrect. Although ASR systems can greatly increase productivity, the need to correct converted speech detracts from the possible productivity maximum.

There is, therefore, a continued need for a system with a class of signal processing processes that accurately recover speech attributes associated with the speaker and with what is spoken without the need for excessive domain training, and with improved accuracy.

BRIEF SUMMARY OF THE INVENTION

It is therefore a principal object and advantage of the present invention to provide a speech-to-text transcription system that does not require excessive training.

It is another object and advantage of the present invention to provide a speech-to-text transcription system that utilizes speech decomposition and normalization methods to provide a normalized signal.

It is a further object and advantage of the present invention to provide a speech-to-text transcription system that compares obtained data to a database of language, dialect, accent, and speaker attributes in order to produce a transcription of the speech.

Other objects and advantages of the present invention will in part be obvious, and in part appear hereinafter.

In accordance with the foregoing objects and advantages, the present invention provides a method for converting speech to text comprising the following steps: (i) receiving a digital signal which encodes a recorded spoken input; (ii) obtaining one or more measurements of the digital audio signal; (iii) identifying one or more characteristics of the digital audio signal by comparing the one or more measurements to a database of digital audio signal characteristics; (iv) transcribing the spoken input using the one or more characteristics of the digital audio signal to create an initial transcription; (v) correlating the one or more speech signal feature measurements to the initial transcription; (vi) calculating at least one speech sound phonetic identification value; and (vii) transcribing at least a portion of the spoken input using the mean values to create a second transcription.

According to a second aspect of the invention is provided a method for converting speech to text which further comprises the step of processing the received digital audio signal. The step of processing can be any speech source-filter decomposition process known in the art, including frequency normalization, error detection, error correction, data compression, spectral analysis, speech waveform perturbation analysis, speech stretching, voicing detection, formant measurement, pitch trajectory analysis, and amplitude pattern analysis, among many other algorithms.

According to a third aspect of the invention is provided a system for converting speech to text which further comprises processing means for filtering the digital audio signal and/or normalization means for normalizing the digital audio signal.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
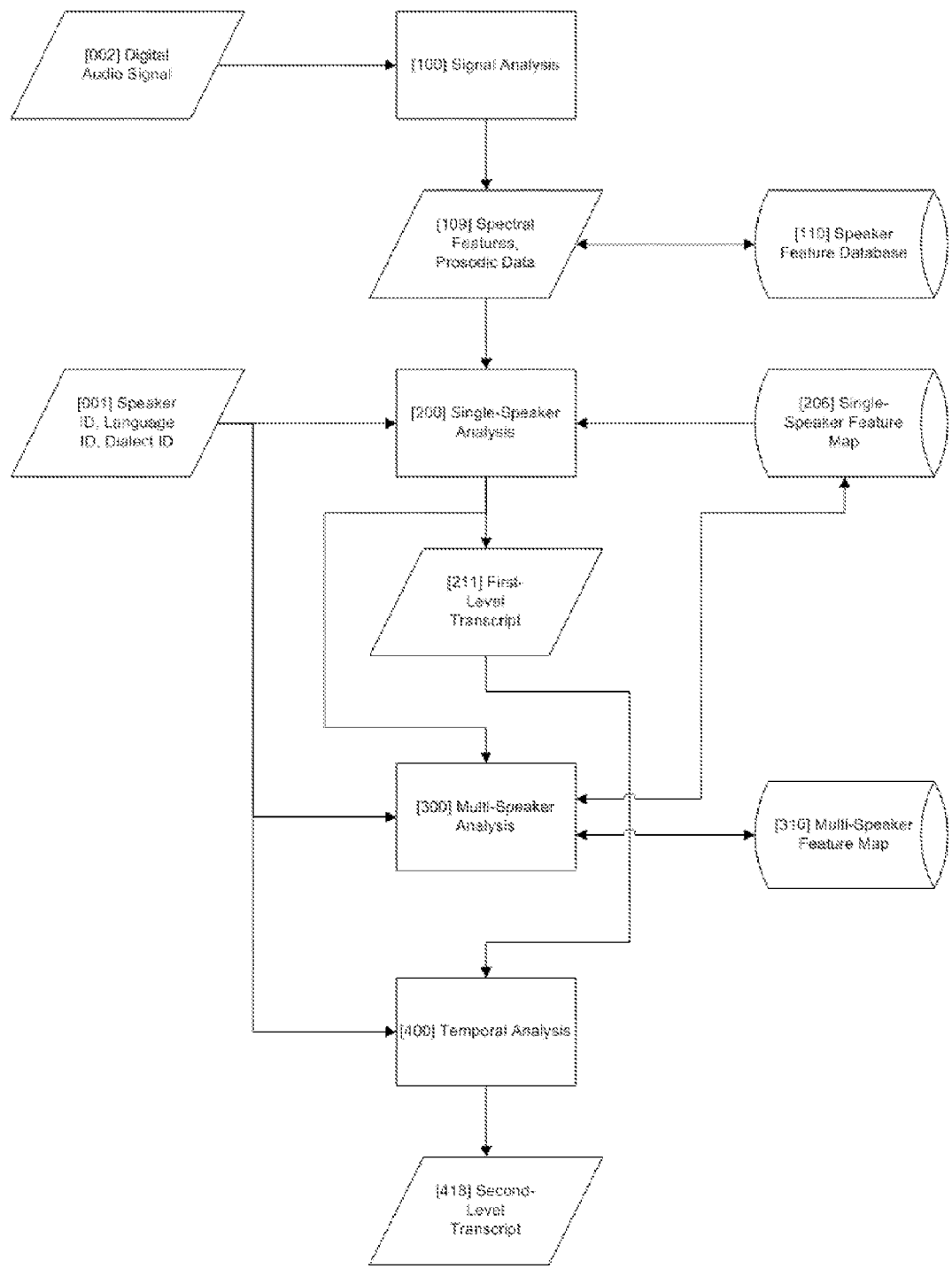
FIG. 1 is a system-level overview of the combined methods of automated voice and speech labeling according to one embodiment of the present invention.
Figure 2:
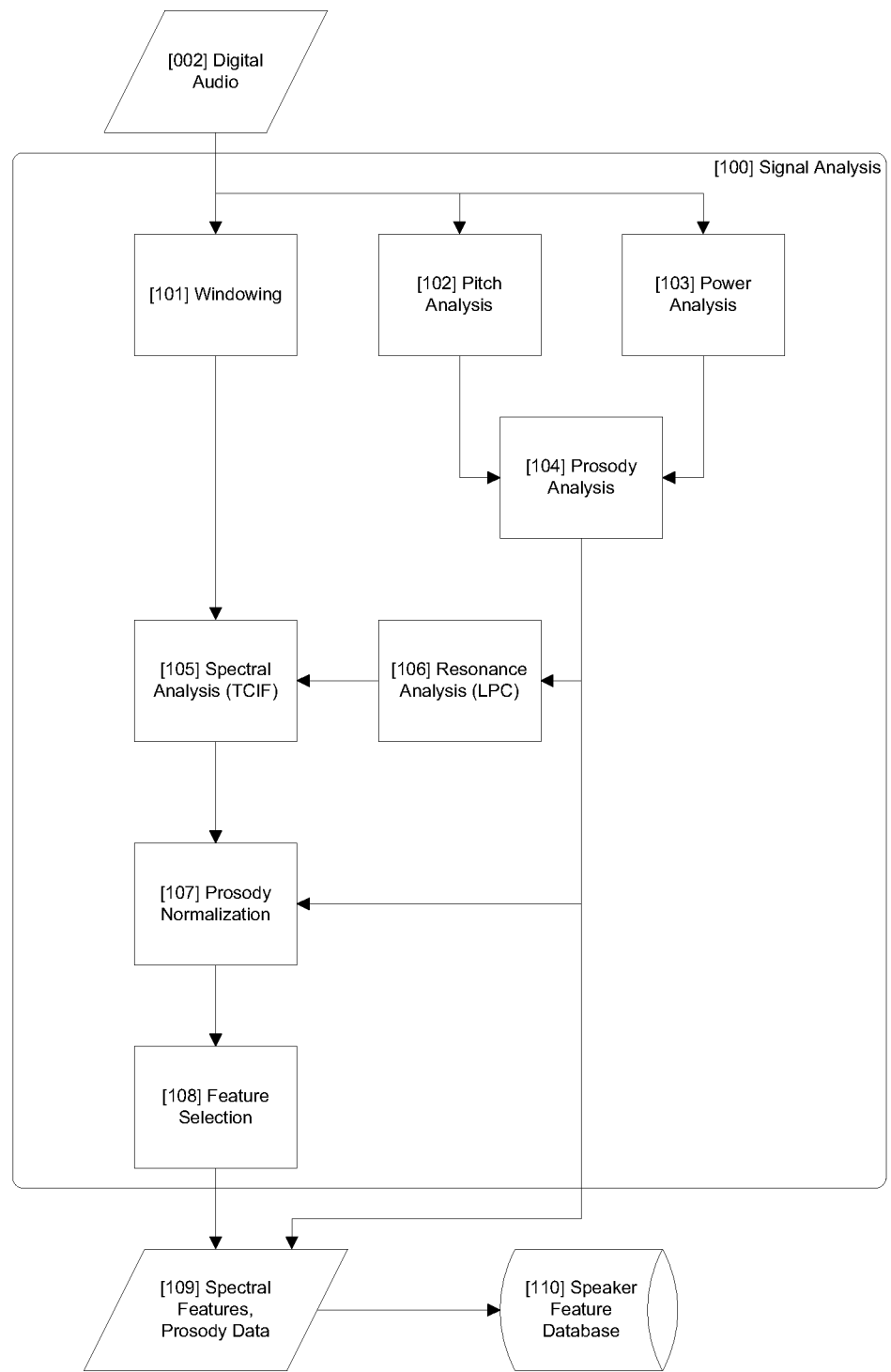
FIG. 2 is a flowchart of a method of automated voice and speech signal analysis, signal normalization, feature selection, and database output according to one embodiment of the present invention.

Referring now to the drawings, wherein like reference numerals refer to like parts throughout, FIG. 1 depicts a flowchart overview of a method of automated voice and speech labeling according to one embodiment of the present invention. The initial inputs comprises digital audio signal 2 and can comprise any digital audio signal, but preferably comprises words spoken aloud by a human being or computerized device. As a pre-processing step, an analog waveform, for example, may be digitized according to any method of analog-to-digital conversion known in the art, including through the use of a commercially-available analog-to-digital converter. A digital signal that is either received by the system for analysis or created per the digitization of an analog signal can be further prepared for downstream analysis by any known process of digital manipulation known in the art, including but not limited to storage of the signal in a database until it is needed or the system is ready to analyze it.

For downstream analysis, digital audio signal 2 is transferred to a signal analysis module 1. Digital audio signal 2 is first processed by reducing the full signal into smaller segment frames in order to improve the time localization of sounds 101. This process is conventionally known in the art as "windowing". The present embodiment preferably uses vocal cord glottal closure instances as reference points for frame segmentation; however, this step may be done on either periodic or aperiodic time scales. Additionally, statistical weighting functions may be applied to each audio segment to reduce the effects of certain speech samples. Common functions include Blackman, Hamming, and Gaussian shapes. The resulting frames are then analyzed for their spectral content 105. The present embodiment uses the Time Corrected Instantaneous Frequency (TCIF) Transform to measure the spectral content (time-frequency-amplitude information) of the signal. Other transform methods may be used or required based on speed and accuracy criteria.

Concurrently, digital audio signal 2 is also processed through a dynamic pitch track analysis 102 and a power track analysis 103, such as by using methods known in the art. The output of the pitch analysis stage 102 includes an estimate of the presence and value, in Hertz, of the fundamental frequency for each sample of the given audio signal. This may include voiced signal with fundamental frequency data in it, such as a vowel sound, unvoiced data, such as a sibilant consonant (e.g. "s") or a combination of voiced and unvoiced fundamental frequency data. Similarly, the output of power analysis stage 103 includes the estimated power value for each sample of the audio signal. The pitch and power information are supplied to a prosody analysis system 104 which builds a statistical model of the given speaker's prosodic characteristics, such as mean pitch and power values and their associated ranges. The prosodic model is later used to normalize the spectral content of each sample frame, as shown by the prosody normalization stage 107.

Resonance analysis 106 is then performed to estimate each frame's resonant frequencies (known in the art as the filter "poles"). The present embodiment utilizes Linear Predictive Coding (LPC) to measure the poles; however, other methods known in the art may be employed. Additionally, prosody analysis 104 information (pitch-power data) may be used to improve the accuracy of resonance analysis 106, since vocal tract resonances are primarily a byproduct of voiced speech sounds. The pole estimates are then correlated with the spectral content from spectral analysis stage 105 to improve each pole's frequency-amplitude resolution.

Prosody Normalization 107 is then required in order to generalize the features contained within the signal to support consistent data clustering (e.g. by removing context dependent cues). The prosody normalization process is performed by inverting the prosodic data acquired by prosody analysis system 104 and applying it to spectral analysis data 105. The result of the normalization process is a monotone, constant-volume data set. The normalized data is then used in a feature selection stage 108, which aims to reduce the frequency-amplitude data to its principle components.

Feature selection stage 108 comprises one of a number of methods for selecting resulting features of interest from each data frame that sufficiently characterizes its unique identifying values. These may include data from the first five resonance frequencies, or "formants"—usually represented by pole and zero frequencies, bandwidths and power measurements. The present embodiment performs this feature selection by dividing the frequency spectrum into a number of bins and extracting the most prominent data points from each bin. These data points may be chosen using various selection criteria: (un)weighted max/min values, entropy, statistical significance, or other selection criteria known in the art. Finally, speaker feature data 109 collects the outputs from each of the preceding processes for use by the speech label part of the system. Speaker feature data 109 can optionally be stored in a speaker feature database 110 for use in later processing and analysis.

As an optional step, the digital signal can be digitally enhanced to improve downstream analysis and can then be fed into the processing and normalization processes. The signal can be enhanced using any method of digital signal enhancement known in the art.

Figure 3:
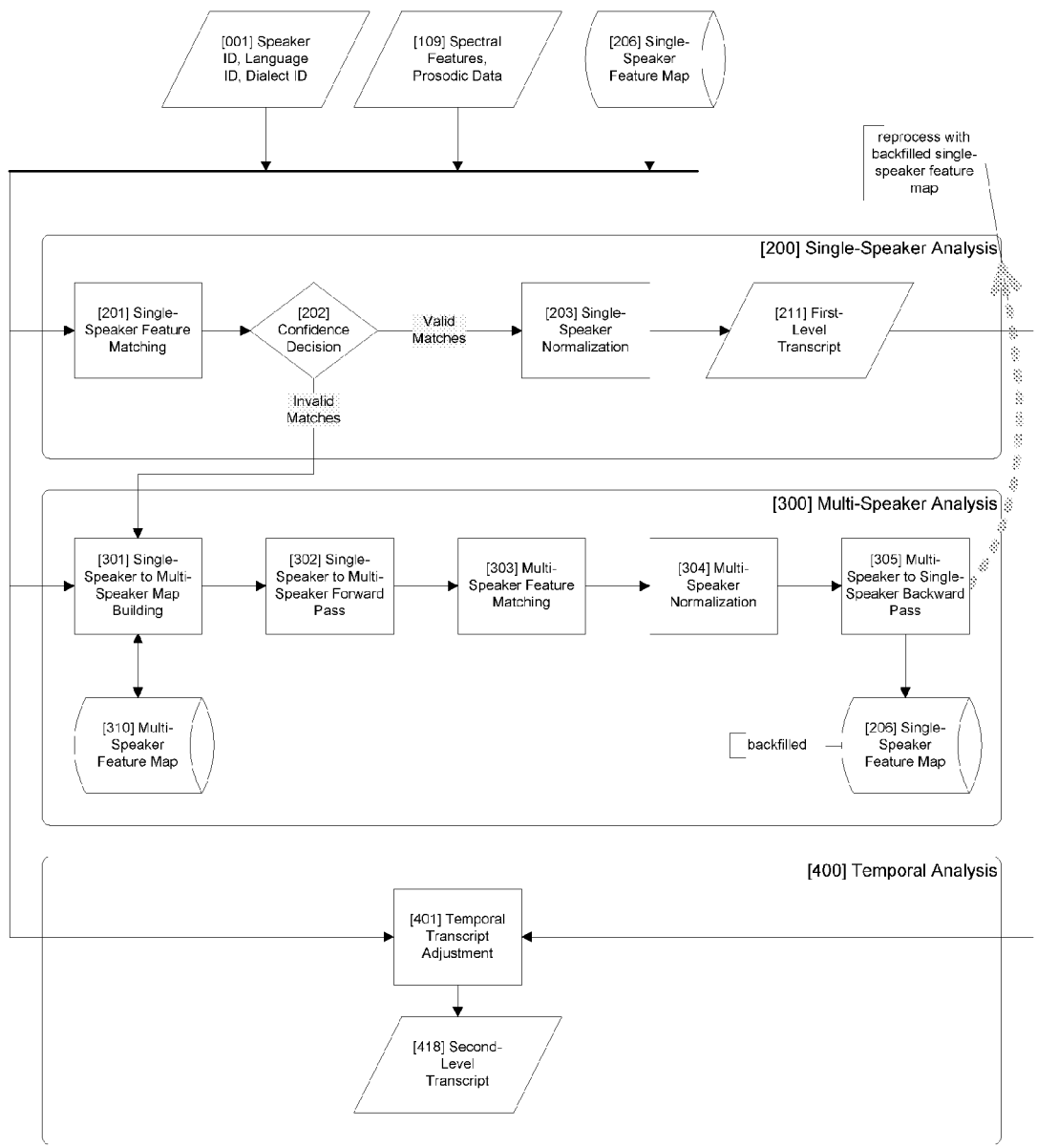
FIG. 3 is an automated voice and speech labeling system according to one embodiment of the present invention.

There is seen in FIG. 3 a flow chart of a further signal and data processing method to label speech features. This involves the selection of non-signal input data 1, such as Speaker Identification (ID), Language ID and Dialect ID. This selection may be performed manually by a user or using an external technology of which there are several available in the art. Additional non-signal data may also be included in an additional embodiment.

A single-speaker feature map 206 contains characterizations of various sounds produced by a given speaker. As such, this database is tailored to a given speaker/language/dialect. Each record consists of various fields that allow for the matching of a given sample. Examples of pertinent database fields include formant features (frequency/bandwidth/amplitude), voiced/unvoiced determination, etc. In order to construct the single-speaker feature map 206, well-labeled samples from the speaker/language/dialect of interest are required. The amount of well-labeled samples can vary, but the more original sample; the less backfilling will be needed. Since a backfilling method, identified as multi-speaker to single-speaker backward pass 305, has been established, the amount of original sample needed is in the order of a few minutes. Additionally, overall quality of single-speaker feature map 206 is dependent on the accuracy and fidelity of the labeled samples.

The process of building single-speaker feature map 206 requires examination of each labeled sample. A pattern for the expected feature values of a given labeled sample can be established using any means from the art including statistical analysis, neural networks, etc. These patterns are used in downstream processing when matching unlabeled data to labeled samples. Note that many windows of data will be present in the data for a given labeled sample.

Single feature matching 201 is a coarse data sample matching process, in which incoming feature vectors are compared to the speaker specific, language specific, dialect specific feature database from single-speaker feature map 206. Exact matches are not required (nor are they practical). This processing box makes no attempt to evaluate the "goodness" of fit for a given sample; it merely determines how close a given sample matches the data stored in the database. Inputs include, but are not limited to: speaker ID, language ID, dialect ID, spectral features, prosodic data, and single-speaker feature map.

For specific data processing, each incoming feature vector is compared to the feature vectors stored in the single-speaker feature map. A closeness measure determines how well an incoming feature vector matches a feature vector stored in the single-speaker feature map. This closeness measure also serves as a confidence measure for downstream processing. Furthermore, these closeness measures are ranked from best match to least. A closeness measure may involve one of many available methods, such as k-means, mean-squared error, etc.

One embodiment of single-speaker feature matching 201 would take an entire spoken phrase and run it through the aforementioned ranking process. This is inherently non-real time. In another embodiment, real time aspects can be realized by processing each feature vector as it arrives. Given that each feature in the single-speaker feature map has a corresponding label, the output of the above process can be considered a temporally ordered stream of confidence ordered labels.

Outputs of single-speaker feature matching 201 include a list of the top N features matches (where N<<|Single-Speaker Feature Map|). At each time t, the output consists of a list of labels and corresponding confidence values ordered from most likely to least. The confidence values assigned at time t are "instantaneous", that is, information from previous confidence values are not taken into account when assigning confidence values at time t, such as:

$Label_1$, $Confidence_1$ (at time t)
$Label_2$, $Confidence_2$ (at time t)
$Label_3$, $Confidence_3$ (at time t)
. . .
$Label_N$, $Confidence_N$ (at time t)
Where: $Confidence_1 \geq Confidence_2 \geq Confidence_3 \geq \ldots \geq Confidence_N$ Confidence decision stage 202 represents a decision step which modifies control flow based on whether the most confident label has sufficient confidence. Specifically, if the highest confidence is greater than a given threshold, then continue processing along single-speaker normalization branch 203; otherwise, process along a multi-speaker analysis branch 3.

Single-speaker normalization 203 adds additional markup to the label information passed as input. Specifically, the markup includes exemplar feature values, i.e., the "normalized" feature values. Inputs to this take the form of label and confidence values for each time sample, as exhibited by the output of single-speaker feature matching stage 201.

Each incoming set of labels/confidences are used to query the single-speaker feature map, in order to retrieve the exemplar features (cluster center) associated with the given label. These exemplar features are appended to the input as a markup/normalization step. The output of this stage may take the following form:

$Label_1$, $Confidence_1$, Exemplar Features (at time t)
$Label_2$, $Confidence_2$, Exemplar Features (at time t)
$Label_3$, $Confidence_3$, Exemplar Features (at time t)
. . .
$Label_N$, $Confidence_N$ (at time t)
Where: $Confidence_1 \geq Confidence_2 \geq Confidence_3 \geq \ldots \geq Confidence_N$ First-level transcript 211 contains the resulting output data from single-speaker normalization process 203 as a first-level transcript of the feature labels and related data.

Multi-speaker feature map 310 contains characterizations of various sounds produced by multiple speakers. As such, this database is not tailored to a given speaker, but may be tailored to a given language/dialect. Each record consists of various fields that allow for the matching of a given sample. Examples of pertinent database fields include formant features (frequency, bandwidth, amplitude), voiced/unvoiced determination, etc. The process of building a multi-speaker feature map is as follows:

1. For each single speaker feature map do
  1.1. For each label within a single speaker feature map do
    1.1.1. Determine the exemplar pattern for the given label
    1.1.2. Add the exemplar pattern to a list associated with that label
  1.2. End
2. End
3. For each label list (containing exemplar patterns from multiple speakers) do
  3.1. Determine the overall exemplar pattern using any means known in the art
  3.2. Add the overall exemplar pattern into the multi-speaker feature map
4. End Single-speaker to multi-speaker map building 301 creates a mapping from a given speaker's feature map to a speaker independent feature map. The required inputs for this process are single-speaker feature map 206 and multi-speaker feature map 310. This process involves creating a transformational mapping from the entries in single-speaker feature map 206 to the corresponding entries in multi-speaker feature map 310. The term "transformational mapping" is used as opposed to "series of transformations" because a series of transformations implies that there is a single transformation from each sound in single-speaker feature map 206 to the corresponding sound in multi-speaker feature map 310. This is not the case. If it were, generalization would be a serious problem when presenting sounds to the mapping that were not present when the mapping was created. Any technique in the art can be used to build this transformational mapping, including but not limited to piecewise linear transforms, neural nets, etc.

Since multi-speaker feature map 310 is built independently from any given single speaker, steps can be taken to insure complete coverage within multi-speaker feature map 310 of any given single speaker sound. Note that the mapping can be run in reverse to move from multi-speaker analysis 3 to single-speaker analysis 2. The resulting output of this process is the multi-speaker transformational mapping.

A key difference between single-speaker analysis 2 and multi-speaker analysis 3 is the use of transformational mappings to analyze a collection of speakers. The forward mapping process is represented in single-speaker to multi-speaker forward pass 302 process. The reverse mapping process is depicted in multi-speaker to single-speaker backward pass 305 process.

Single-speaker to multi-speaker forward pass 302 converts a specific speaker's spectral features and/or prosodic data to a speaker independent set of features. This is a simple process of applying the transformational mapping derived in step 301 to the current spectral features and prosodic data 109. The resulting output of this process is the multi-speaker spectral features and multi-speaker prosodic data needed for multi-speaker feature matching 303.

Multi-speaker feature matching 303 takes incoming feature vectors and compares them to the language specific, dialect specific, speaker independent feature database—the multi-speaker feature map 310. Exact matches are not required (nor are they practical). This processing box makes no attempt to evaluate the "goodness" of fit for a given sample; it merely determines how close a given sample matches the data stored in the database. Inputs required for this process include, but are not limited to the following: language ID, dialect ID, spectral features, prosodic data, and multi-speaker feature map.

Each incoming feature vector is compared to the feature vectors stored in multi-speaker feature map 310. A closeness measure determines how well an incoming feature vector matches a feature vector stored in the multi-speaker feature map. This closeness measure also serves as a confidence measure for downstream processing. Furthermore, these closeness measures are ranked from best match to least. One embodiment of this method would take an entire spoken phrase and run it through the aforementioned ranking process. This is inherently non-real time. In another embodiment, real time aspects can be realized by processing each feature vector as it arrives. Given that each feature in multi-speaker feature map 310 has a corresponding label, the output of this process can be considered a temporally ordered stream of confidence ordered labels.

The output data of multi-speaker feature matching 303 take the form of a list of the top N features matches (where N<<|Multi-Speaker Feature Map|). At each time t, the output consists of a list of labels and corresponding confidence values ordered from most likely to least. The confidence values assigned at time t are "instantaneous", that is, information from previous confidence values are not taken into account when assigning confidence values at time t. The data contained in the map may take the following form:

$Label_1$, $Confidence_1$ (at time t)
$Label_2$, $Confidence_2$ (at time t)
$Label_3$, $Confidence_3$ (at time t)
. . .
$Label_N$, $Confidence_N$ (at time t)
Where: $Confidence_1 \geq Confidence_2 \geq Confidence_3 \geq \ldots \geq Confidence_N$ Multi-speaker normalization 304 adds additional markup to the label information passed as input. Specifically, the markup includes exemplar feature values, i.e., the "normalized" feature values. Each incoming set of labels/confidences are used to query multi-speaker feature map 310, in order to retrieve the exemplar features (cluster center) associated with the given label. These exemplar features are appended to the input (as a markup/normalization step). The resulting output data is as follows:

$Label_1$, $Confidence_1$, Exemplar Features (at time t)
$Label_2$, $Confidence_2$, Exemplar Features (at time t)
$Label_3$, $Confidence_3$, Exemplar Features (at time t)
. . .
$Label_N$, $Confidence_N$ (at time t)
Where: $Confidence_1 \geq Confidence_2 \geq Confidence_3 \geq \ldots \geq Confidence_N$ Multi-speaker to single-speaker backwards pass 305 stage converts multi-speaker spectral features and/or prosodic data to a single-speaker specific set of features. This requires the output data from multi-speaker normalization 304, as well as single-speaker to/from multi-speaker mapping 301. The resulting output includes single-speaker spectral features and single-speaker prosodic data, similar to what is contained in single-speaker feature map 206.

Multi-speaker to single-speaker backwards pass 305 stage applies in reverse the transformational mapping previously derived to the current spectral features and prosodic data. The results of this processing are fed back into single-speaker feature map 206 and single-speaker analysis 2 is rerun.

Temporal transcript adjustment process 401 analyzes first-level transcript 211 through time, making adjustments to the confidence values of the labels based on temporal patterns. These adjustments take speaker, language, and dialect information into account. Since the language, dialect, and speaker are known, it is possible (and desirable) to gather statistics to adjust the confidence values provided by first-level transcript 211. Additionally, because the first-level transcript 211 generated its guesses "instantaneously" in time, taking into account the guesses from the time period around to current time can greatly enhance the accuracy of the current guess.

Any technique from the art can be used to adjust the confidence values, including but not limited to Bayes nets, hidden Markov models, etc.

One embodiment of this method would take an entire first-level transcript and run it through the aforementioned analysis process. This is inherently non-real time. In another embodiment, real time aspects can be realized by processing a sliding window of transcript. The output data of this process is similar in format to that of first-level transcript 211, including label, confidence values, and exemplar feature sets for each time sample as follows:

$Label_1$, $Confidence_1$, Exemplar Features (at time t)
$Label_2$, $Confidence_2$, Exemplar Features (at time t)
$Label_3$, $Confidence_3$, Exemplar Features (at time t)
. . .
$Label_N$, $Confidence_N$ (at time t)
Where: $Confidence_1 \geq Confidence_2 \geq Confidence_3 \geq \ldots \geq Confidence_N$ Second-level transcript 418 contains the outputs of the temporal transcript adjustment process as a second-level transcript. The secondary transcription or the digital signal can then be used for continued processing or analysis in any text normalization process, including comparison of the transcription to a database of known text, and comparison and correction using a dictionary, among many others. The output format is the same as the first level transcript but the accuracy of the transcription has been enhanced by accounting for additional characteristics as discussed previously.

Although the steps above are described in conjunction with certain modules, the description is merely for ease of understanding and for describing an embodiment of the invention and is not meant to limit the scope of the invention. The steps of the method described herein can be performed in a wide variety of ways using a wide variety of modules and/or components.

Although the present invention has been described in connection with a preferred embodiment, it should be understood that modifications, alterations, and additions can be made to the invention without departing from the scope of the invention as defined by the claims.

What is claimed is:

1. A method for converting speech to text, comprising the steps of:
  receiving a digital signal comprising a recorded spoken input;
  obtaining at least one measurement of said digital signal, the measurement comprising a first measured portion of said recorded spoken input and a second measured portion of said recorded spoken input;
  identifying at least one characteristic of said digital signal by comparing said first measured portion of said recorded spoken input to a first database of digital audio signal characteristics;
  transcribing said first measured portion of said recorded spoken input using said at least one characteristic of said digital signal to create an initial transcription;
  backfilling said first database of digital audio signal characteristics with at least one characteristic from a second database of digital audio signal characteristics;
  identifying a second characteristic of said digital signal by comparing said second measured portion of said digital signal to said backfilled first database of digital audio signal characteristics;
  transcribing said second measured portion of said recorded spoken input using said second characteristic of said digital signal.

2. The method of claim 1, further comprising the step of processing the received digital signal.

3. The method of claim 2, wherein the step of processing the received digital signal comprises the step of obtaining at least one measurement of said spoken input.

4. The method of claim 2, wherein the step of processing the received digital signal comprises the step of labeling vocal and non-vocal portions of said spoken input.

5. The method of claim 1, further comprising the step of normalizing said digital signal.

6. The method of claim 1, wherein said at least one characteristic of said digital signal is a characteristic of the speaker of said spoken input.

7. The method of claim 1, wherein at least one characteristic of said digital audio signal is used to produce said first level transcription.

8. The method of claim 1, further comprising the step of displaying said second transcription on a monitor.

9. A system for converting speech to text, the system comprising:
- a digital audio signal comprising an encoding of a recorded spoken input;
- means for obtaining at least one measurement of said digital audio signal, the measurement comprising a first measured portion of said recorded spoken input and a second measured portion of said recorded spoken input;
- means for comparing said first measured portion of said recorded spoken input to a first database of digital audio signal characteristics;
- means for identifying at least one characteristic of said digital audio signal based on said comparison;
- means for transcribing said first measured portion of said spoken input using said at least one characteristic of the digital audio signal to create an initial transcription;
- means for backfilling said first database of digital audio signal characteristics with at least one characteristic from a second database of digital audio signal characteristics;
- means for identifying a second characteristic of said digital signal by comparing said second measured portion of said digital signal to said backfilled first database of digital audio signal characteristics; and
- means for transcribing said second measured portion of said recorded spoken input using said second characteristic of said digital signal.

10. A system according to claim 9, further comprising means for filtering the digital audio signal.

11. A system according to claim 9, further comprising normalization means for normalizing the digital audio signal.

12. A system according to claim 9, comprising normalization means for normalizing prosodic speech features.

13. A system according to claim 9, comprising means for labeling the vocal and nonvocal portions of said digital audio signal.

14. A system according to claim 9, further comprising means identifying at least one characteristic of said digital audio signal.

15. A system according to claim 9, further comprising means for comparing characteristics to produce said initial transcript.

16. A system according to claim 9, further comprising means for constructing a multi-speaker feature map.

17. A system according to claim 9, further comprising means for using a multi-speaker feature map to backfill a single-speaker feature map.

18. A system according to claim 9, further comprising displaying means for displaying the second transcription on a monitor.

19. The method of claim 1, wherein said second database of digital audio signal characteristics is populated with characteristics derived from a plurality of speakers.

20. The system of claim 9, wherein said second database of digital audio signal characteristics is populated with characteristics derived from a plurality of speakers.

* * * * *